Oct. 19, 1943.   J. E. HENNINGSEN   2,331,908
POWER TRANSMISSION DEVICE
Filed April 6, 1942   2 Sheets-Sheet 1

Inventor
JOHN E. HENNINGSEN
By Carlsen & Hagle
Attorneys

Oct. 19, 1943.  J. E. HENNINGSEN  2,331,908
POWER TRANSMISSION DEVICE
Filed April 6, 1942  2 Sheets-Sheet 2
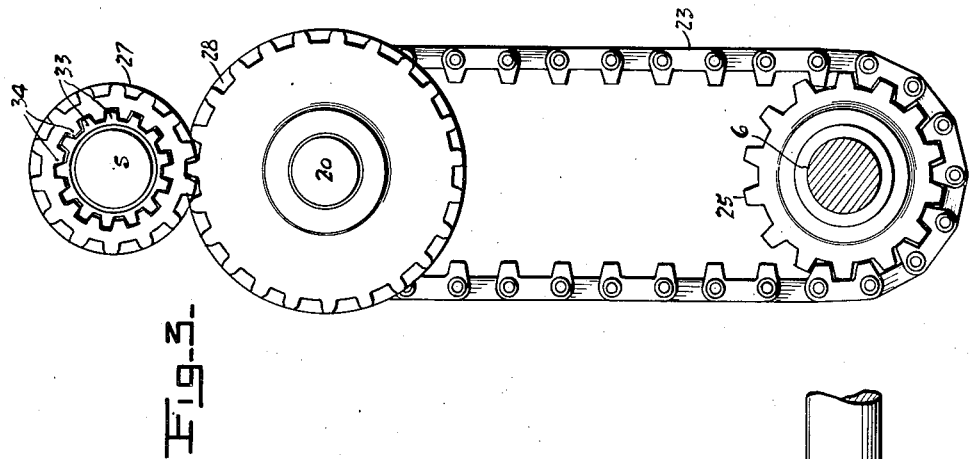
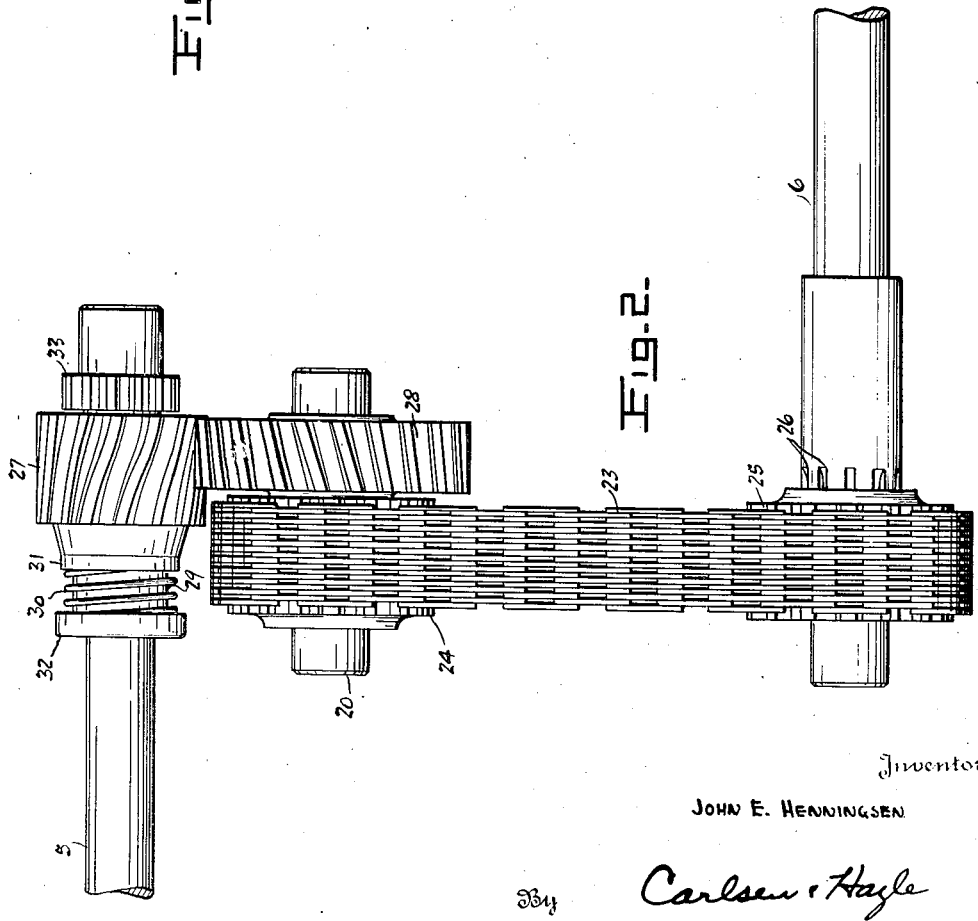
Inventor
JOHN E. HENNINGSEN
By Carlsen & Hagle
Attorneys Patented Oct. 19, 1943

2,331,908

UNITED STATES PATENT OFFICE 2,331,908

POWER TRANSMISSION DEVICE

John E. Henningsen, Minneapolis, Minn., assignor to Minneapolis-Moline Power Implement Company, Minneapolis, Minn., a corporation of Delaware Application April 6, 1942, Serial No. 437,797

3 Claims. (Cl. 74—405)

This invention relates generally to improvements in power transmission devices and more particularly to a drive mechanism for the front wheels of a four wheel-drive vehicle.

In such vehicles it is the custom to drive the front wheels through a differential mechanism in order to permit the front wheels to travel or turn faster than the rear wheels as is sometimes necessary. In addition there are, of course, differentials of usual form between the respective front and rear wheels for the usual purpose. There is thus used in each vehicle no less than three separate and distinct differential devices, each of which is a comparatively complicated, expensive and heavy piece of machinery.

It is the primary object of my invention to provide a light, inexpensive and simple drive means which may replace the differential used between engine and front wheels and which is so constructed that, while the drive is ordinarily transmitted to these wheels, it is automatically disengaged if the wheels have a tendency to turn faster than the speed at which they are being engine driven. Another object is to provide a drive mechanism of this kind which is compact and capable of being readily applied to and housed in the engine or transmission parts of the vehicle.

These and other more detailed and specific objects will be disclosed in the course of the following specification, reference being had to the accompanying drawings, in which—

Fig. 2 is an edge view or elevation of the device alone, or as removed from the housing.

Fig. 3 is an end view of the structure as shown in Fig. 2.

Figure 1:
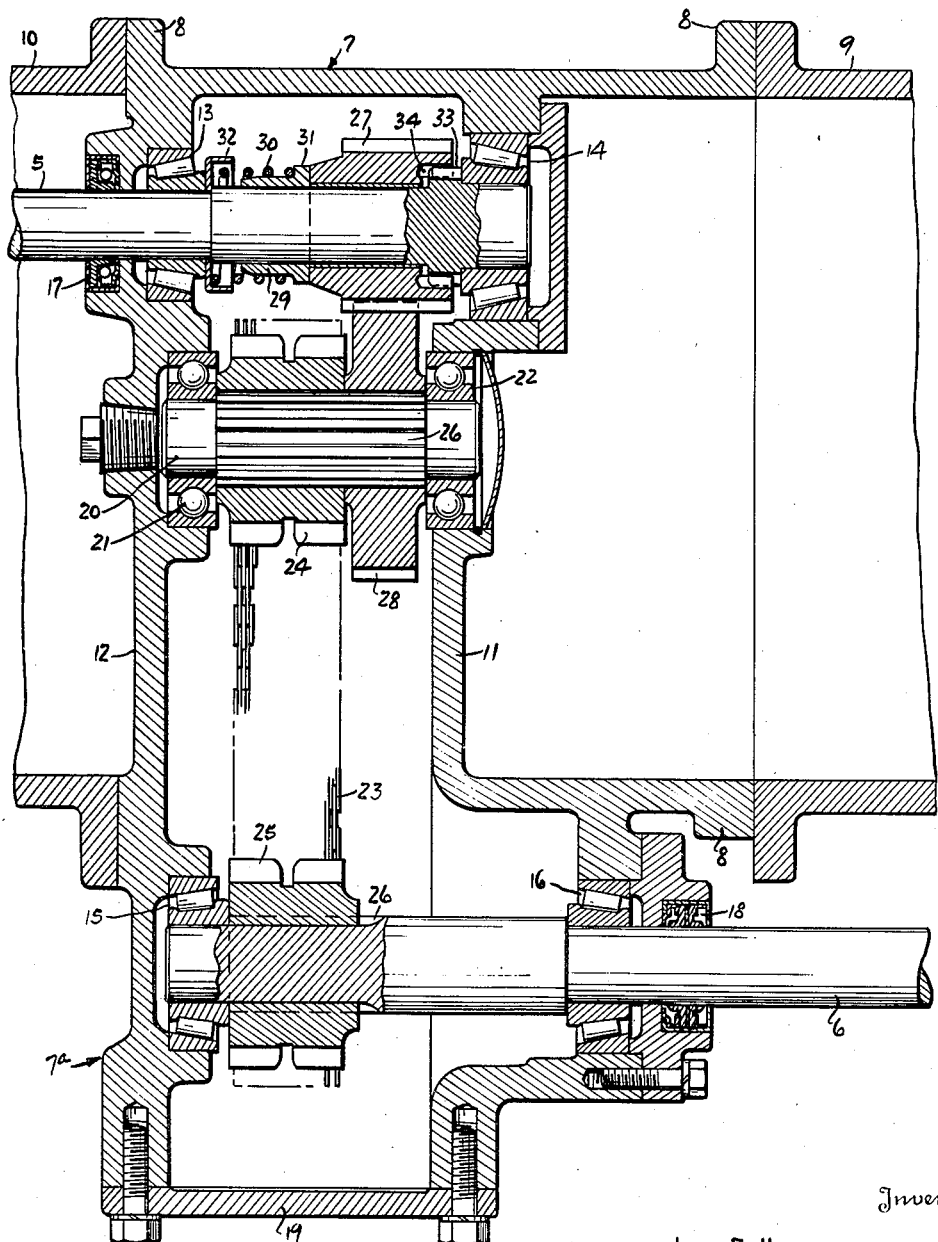
Fig. 1 is a longitudinal sectional view through my improved transmission or driving device, showing the housing and bearing supports therefor.

Referring now with more particularity and by reference characters to the drawings, 5 designates the power shaft and 6 the driven shaft of my device, said shaft 5 being connected through any conventional clutch and change speed transmission mechanism to the engine, while shaft 6 is connected through the usual differential to the front wheels of the vehicle. Such parts as the engine, change speed gears and wheels are not here shown, being entirely conventional in form. The shaft 5 is thus normally the drive shaft and 6 the driven shaft.

Said shafts are arranged in spaced parallel relation at opposite ends or sides of a housing 7 which housing is preferably provided with flanges 8 by means of which it may be interposed between front and rear sections 9 and 10 of the usual engine or transmission housings or casings of the vehicle. This mounting permits the housing 7 to be inserted simply as a spacer between other housing sections as will be evident.

The housing 7 has spaced walls 11 and 12 in and through which the shafts 5 and 6 are journaled with suitable spaced pairs of anti-friction bearings 13—14 and 15—16, installed around each shaft in the walls as clearly shown. Dust and oil seals 17 and 18 are also provided where the shafts extend through the housing walls. It will be noted that the end or side 7a of the housing, wherein driven shaft 6 is located, projects beyond the plane of the housing sections 9 and 10 and thus this shaft may extend into the open for extension to and connection with the front wheels. A removable cover plate 19 on this extension or projecting portion 7a of the housing permits inspection of the interior.

A third shaft or countershaft 20 is arranged between the shafts 5 and 6, parallel therewith and adjacent to the drive shaft 5, this shaft being journaled at its ends in anti-friction bearings 21 and 22 arranged in the adjacent walls of the housing. The shafts 6 and 20 are connected by a silent chain 23 running over sprockets 24 and 25 secured to the respective shafts by splines 26 and these two shafts are thus caused to rotate in unison at all times. Obviously other drive and connecting means such as belts or gears (not shown) might be used in lieu of the chain and sprockets if so desired.

A helical gear 27 is journaled and slidably mounted upon the drive shaft 5 and meshes with a helical gear 28 secured to countershaft 20 by the splines 26. The gear 27, although smaller in diameter than the gear 28, has a wider face as shown. Arranged against one end of the gear 27 is a follower 29 slidably mounted on the shaft 5 and an expansion coil spring 30 is braced between a flange 31 on this member and a collar 32 which is braced against the adjacent shaft bearing 13 (Fig. 1) in such manner that the spring will normally urge the gear 27 endwise along the shaft toward the opposite bearing 14 and transversely to the face of gear 28. Gear or clutch teeth 33 are formed around the shaft 5 adjacent the bearing 14 and the adjacent end of the gear 27 is bored out and provided with internal gear teeth 34 adapted to mesh with the teeth 33 when the gear is moved endwise as described by said spring 30. The gear teeth 33 and 34 thus act as a clutch to connect the gear 27 and shaft 5 as will be apparent.

The normal operating position is, as shown in Fig. 1, with the gear 27 connected through the gear or clutch teeth 33 and 34 to the drive shaft 5 and so long as this condition maintains it is apparent that power rotation applied to the shaft 5 will be transmitted through the gears 27 and 28 and chain 23 to the shaft 6 to rotate the latter and of course drive the front wheels of the vehicle. The helical teeth of the gears 27 and 28 have a helix angle so formed and so related to the normal direction of rotation that as power is applied at shaft 5 the tendency of the gear 27 is to have a screw action with respect to gear 28 causing it to move endwise along the shaft and engage the teeth 33—34, meanwhile of course maintaining meshing engagement with gear 28. In such action initial endwise movement for engagement of these teeth is provided for by the spring 30 the thrust of which is exerted in this direction. However, should the shaft 6 become, in effect, the drive shaft through a tendency of the front wheels of the vehicle to travel faster than their driven speed, the conditions become reversed. That is, the gear 28 now is the driver and it will screw the gear 27 in the reverse direction away from the teeth 34 causing the teeth 33 to disengage and allow gear 27 to turn free on shaft 5 as will be seen in Fig. 2. The gear 27 moves across the face of gear 28 as this occurs but remains in mesh therewith. Thus it will be evident that so long as there is a load on the shaft 6 and the front wheels of the vehicle are being driven my entire mechanism becomes a unitary drive assembly, but when the load is removed, or actually reversed, by the front wheels for any reason running faster, then the clutch provided by teeth 33—34 is automatically disengaged allowing the gear 27 to turn free on the power shaft and the front wheels are entirely disconnected from the engine of the vehicle. Immediately as the load again comes on the shaft 6 after each disengagement as described the spring 30 of course will reassert itself to return the gear 27 toward locked engagement with the power shaft 5 restoring the parts to driving condition.

The device thus makes use of the tendency of helical gears toward relative endwise displacement, or screw action of one on the other, in order to shift one gear from a locked to a disengaged position on the power shaft entirely automatically and in response to changing load conditions. The device is obviously extremely simple, durable and inexpensive and well suited to its intended purposes.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A power transmission device for operatively connecting a power shaft and a driven shaft, comprising a helical gear slidably and rotatably mounted on the power shaft and having internal gear teeth on one end, said power shaft having integral gear teeth for engaging said internal teeth when the gear is moved endwise along the shaft and to thereby releasably lock the gear for rotation with the shaft, a spring arranged to normally urge the gear toward said locked position, and another helical gear meshing with the first and operatively connected to the driven shaft to rotate therewith, the helical teeth of said gears being so angled that the gear on the power shaft will be urged away from locked position by rotation of the driven shaft at greater than its driven speed.

2. In a four wheel drive motor vehicle, mechanism for connecting the front wheels to a drive shaft operated by the motor, comprising a shaft adapted to be operatively connected to the front wheels, meshing helical gears on the drive and front wheel driving shafts, the gear on the drive shaft being slidably mounted thereon and adapted to be moved endwise by the end thrust of the helical gear teeth in one direction in response to overrunning action of the front wheel driving shaft with respect to the drive shaft, spring means normally and yieldably moving the gear in the opposite direction, and clutch means for normally connecting the gear to the drive shaft but operative to release the gear therefrom when the other shaft overruns.

3. In a four wheel drive motor vehicle, mechanism for driving the front wheels from a power shaft connected to the motor, comprising a countershaft arranged alongside said power shaft, meshing helical gears on the shafts, a third shaft adapted to be connected to the front wheels, means connecting the countershaft and third shaft for driving the latter, the gear on the power shaft being slidably mounted thereon and movable in one direction under influence of the end thrust set up by the helical teeth of the gears when the countershaft overruns the power shaft due to action of the front wheels of the vehicle, clutch means for locking the gear on the power shaft against rotation thereon and releasable in response to said movement of the gear to permit the gear to turn free of the power shaft when said countershaft overruns, and spring means normally urging the gear on the power shaft in the opposite direction into locked engagement with the shaft.

JOHN E. HENNINGSEN.